May 28, 1935.  J. A. CARR  2,002,977
DYNAMOMETER
Filed June 29, 1931  2 Sheets-Sheet 1
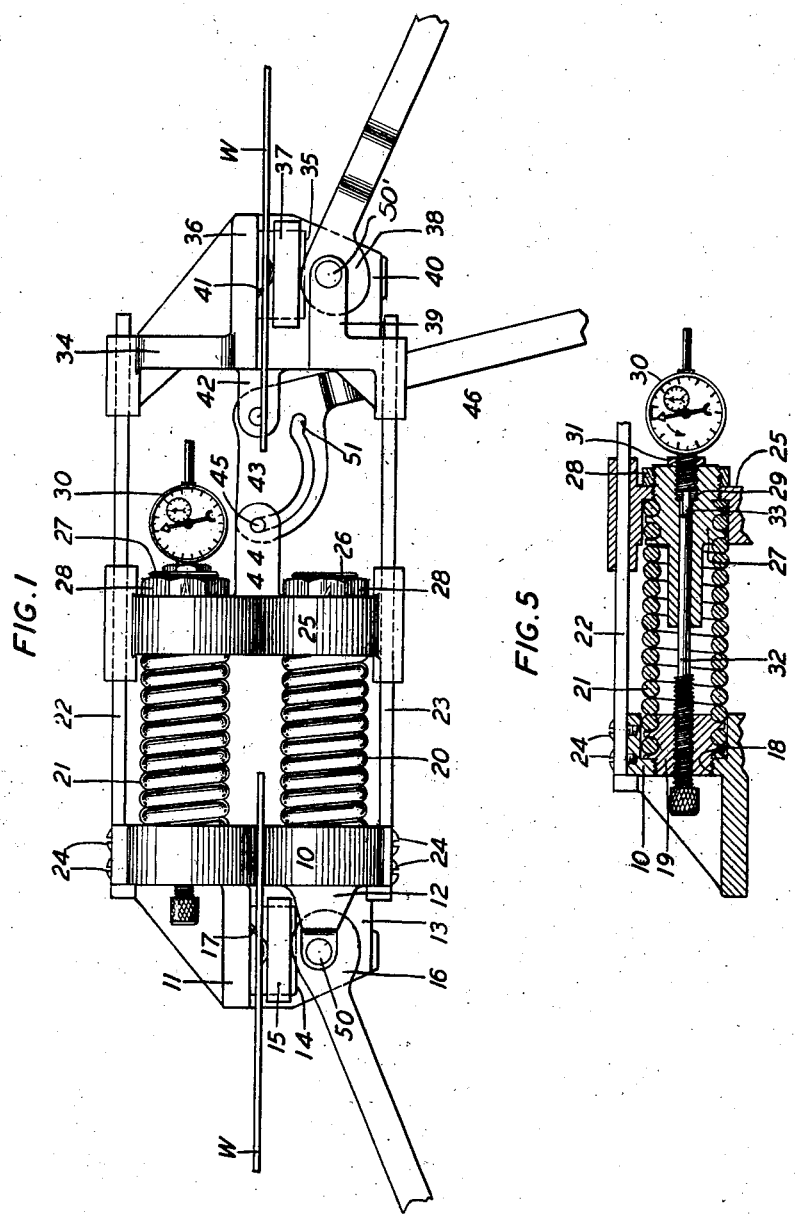

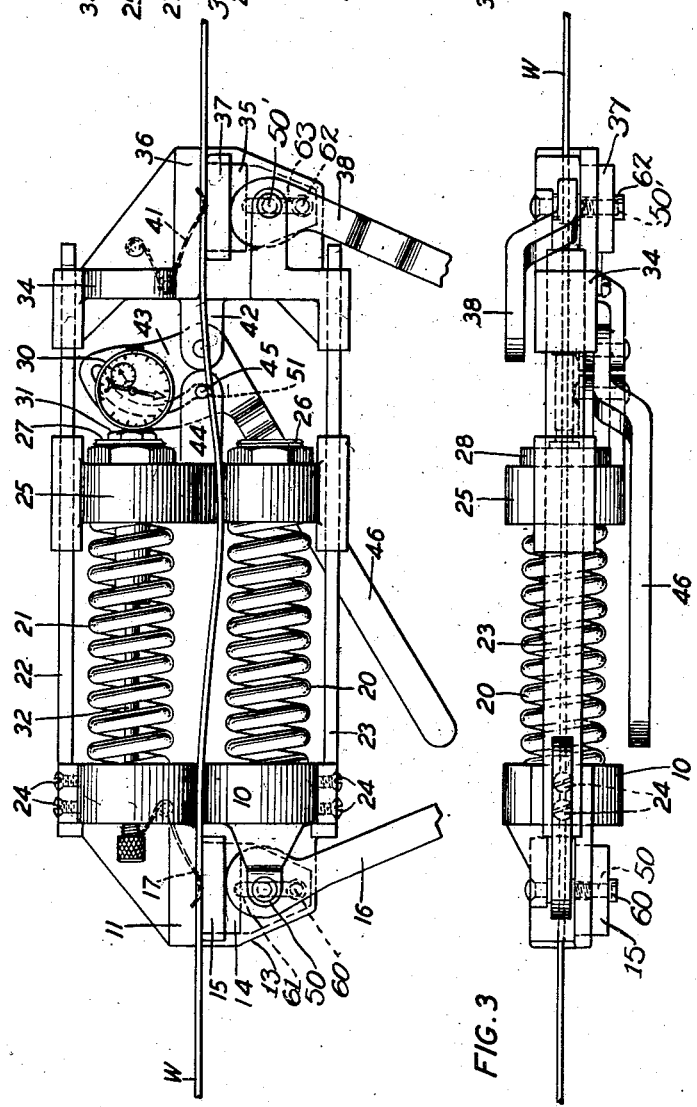

Patented May 28, 1935

2,002,977

UNITED STATES PATENT OFFICE 2,002,977

DYNAMOMETER

James A. Carr, Maplewood, N. J., assignor to Bell Telephone Laboratories, Incorporated, New York, N. Y., a corporation of New York Application June 29, 1931, Serial No. 547,507

2 Claims. (Cl. 265—1)

This invention relates to dynamometers for use for measuring the tension in wire spans and the like.

In dynamometers heretofore used for measuring the tension in wire spans, hook members are provided at the ends of a bar for engaging and retaining the wire in place during the operation of a third member tending to deviate the wire in a direction at right angles to its length, a gage being provided for recording the movement of the latter member in terms of the tension in the wires.

While these dynamometers have been found satisfactory for the measurement of wires of relatively large diameters they are inaccurate for the tension measurement of small wires owing to the amount of friction developed at the hooks with wire under tension. Kinks or bends in the wires also vary the force required to push the wire out of line and this also introduces other serious errors in the tension measurement of fine wires.

In the dynamometer of this invention these errors are avoided by the provision of means whereby the tension of the wire is transferred to a spring mechanism acting in line parallel to the general direction of the wire, thus avoiding the errors due to bends in the wire and to the friction of the wire with the actuating parts of the dynamometer mechanism.

This is accomplished by providing pairs of clamping devices for positively gripping the wire at two places a small distance apart. A pair of springs are attached at one end to one of the clamping devices and the other ends of these springs are attached to a movable cross bar slidably mounted on a guiding member which also supports the other clamping device. A link in the form of a cam connects the movable clamping device to the cross bar and this cam is operable for tensioning the springs for transferring the tension in the wire to the dynamometer mechanism. A gage which is carried by the cross bar has its actuating member disposed in operable relation with a rod mounted on the stationary block, this gage being operable for indicating the movement of this cross bar and thereby the elongation of the springs in terms of the tension in the wire.

Other features of the invention and advantages will appear from the following description and by the claims appended thereto, reference being had to the accompanying drawings in which:

Fig. 1 is a front assembly view showing the springs tensioning mechanism and the wire clamping devices in normal non-operated position;

Fig. 2 is a front assembly view showing the springs tensioning mechanism and the wire clamping devices in the operated position;

Fig. 3 is a side view of Fig. 2;

Fig. 4 is an end view; and

Fig. 5 is a partial view in section showing the gage actuating mechanism.

Through the several figures, 10 indicates a mounting block having a jaw member 11 and brackets 12 and 13 integrally formed therewith. The bracket 13 is provided with a rectangular opening 14, in which an L-shaped jaw member 15 is mounted for movement toward jaw member 11 under control of a manually operable cam 16. Jaw member 15 is guided in its gripping movement toward jaw member 11 by a stud 60 engaging a slot 61 and by the side walls of aperture 14 engaging the jaw as shown in Figs. 2 and 3. This cam is pivotally mounted on a stud 50, in turn journaled on brackets 12 and 13. A substantially V shaped spring 17 shown in Figs. 1 and 2 is provided for retracting the jaw member 15 to normal upon the movement of cam 16 from position shown in Fig. 2 to position shown in Fig. 1, the movement of cam 16 in position shown in Fig. 2 being effective to clamp the wire W between the jaw members 11 and 15.

The mounting block 10 has two screw threaded holes 18, as shown in Fig. 5, provided for receiving similar threaded plugs 19. These plugs have each an enlarged threaded portion for engagement with the ends of springs 20 and 21. On the block 10 is mounted a pair of bars 22 and 23, which are securely held thereon by a number of screws, such as 24. These bars extend in parallel relation with respect to the longitudinal axes of springs 20 and 21 and on them is slidably mounted a cross bar 25. This bar, like the block 10, has two countersunk holes for receiving the plugs 26 and 27 shown in Figs. 1, 2 and 4 and in sectional view in Fig. 5. These plugs are securely held therein by nut screws 28 and each of these plugs carries screw threads for engaging the other ends of springs 20 and 21, thus securing the ends of these springs to block 10 and cross bar 25.

As shown in Fig. 5, plug 27 has a centrally threaded hole 29 for mounting a gage 30 and a counter-nut 31 is provided for securely holding this gage in adjusted position on the plug. A rod 32 threadedly engages the plug 19 carried by block 10 and extends in a guide extension formed with plug 27 in engageable relation with the actuating plunger 33 of gage 30.

On the free ends of bars 22 and 23 there is slidably mounted a block 34 having a jaw member 36 and a rectangularly shaped opening 35 for receiving a movable jaw member 37 arranged to be actuated by a manually operable camming member 38 rotatably mounted on a stud 50'. Jaw member 37 is guided in its gripping movement toward jaw member 36 by a stud 62 engaging a slot 63 and the side walls of aperture 35, as shown in Figs. 2 and 3. This cam is pivotally mounted on brackets 39 and 40 formed integrally with the block 34 and a spring 41 is provided for retracting this jaw member to normal upon a movement of cam 38, the movement of this cam being effective to clamp the wire W between the jaw members 36 and 37.

The block 34 carries an inwardly extending bracket 42 on which a manually operated cam 43 is pivoted. The cross bar 25 carries a bracket 44 having a stud 45 engaged by the cam 43, the movement of this cam from the position indicated in Fig. 1 to the position indicated in Fig. 2 being effective to tension the springs 20 and 21 for transferring the tension in the wire to these springs and to cause the operation of the gage 30 as will be hereinafter described in detail.

In a typical example of operation the wire W, which may be of two pieces as shown in Fig. 1 or of a single piece as shown in Fig. 2, is placed between the pairs of jaw members 11—15 and 36—37 and the camming members 16 and 38 moved from position shown in Fig. 1 to position shown in Fig. 2 for securing the wire to the blocks 10 and 34. The cam 43 is then moved from position shown in Fig. 1 to position shown in Fig. 2 for tensioning the springs 20 and 21, this cam remaining in the operated position against the tension of the springs upon reaching the radial portion 51 at the end of the cam. The tensioning of springs 20 and 21 is effective to transfer the tension in the wire to the springs owing to the non-yieldable link between the cross bar 25 and the block 34 offered by the cam 43. The cross bar 25 and the block 34 connected thereto are caused to slide along the bars 22—23 until the tension of the springs equalizes the tension in the wire. The movement of cross bar 25 and block 34 with respect to block 10 is effective to cause the operation of the gage 30 due to the engagement of rod 32 with the actuating plunger 33 of gage 30, thus translating the movement of the cross bar 25 relative to block 10 and thereby the tension in the springs 20—21 in terms of the tension in the wire.

What is claimed is:

1. In a device of the kind described, a frame having a fixed clamping member and a movable clamping member, a block slidable upon said frame between the clamping members, spring means between the fixed clamping member and said block, said spring means being anchored at its ends to said fixed clamping member and said block respectively, a gauge for indicating the tension of said spring means, a tensioning cam lever connecting said slidable block and movable clamping member for drawing them toward each other against the tension of said spring means and thereby transferring the tension in the specimen held by the clamping members to said spring means.

2. In a wire testing dynamometer, a clamping device, guiding members carried by said device, another clamping device slidably mounted on said members, a movable cross bar slidably arranged on said guiding members, springs interconnecting the first mentioned clamping device with said cross bar, a tensioning mechanism for said springs interconnecting the second mentioned device with said cross bar and operable to move said cross-bar and second clamping device together a predetermined distance for transferring the tension of the wire to said springs, and a gage for indicating the movement of said cross bar and the second mentioned clamping device away from the first mentioned device.

JAMES A. CARR.